United States Patent
Dubrovsky et al.

(10) Patent No.: US 12,379,917 B2
(45) Date of Patent: Aug. 5, 2025

(54) SECURING SERVERLESS COMPUTING WORKLOADS IN A COLD START

(71) Applicant: Dell Products L.P., Round Rock, TX (US)

(72) Inventors: Igor Dubrovsky, Beer Sheva (IL); Stav Sapir, Beer Sheba (IL); Yair Yotam, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 18/326,886

(22) Filed: May 31, 2023

(65) Prior Publication Data

US 2024/0403022 A1  Dec. 5, 2024

(51) Int. Cl.
*G06F 8/65* (2018.01)
*G06F 8/61* (2018.01)

(52) U.S. Cl.
CPC . *G06F 8/65* (2013.01); *G06F 8/63* (2013.01)

(58) Field of Classification Search
None
See application file for complete search history.

(56) References Cited

U.S. PATENT DOCUMENTS

| | | | |
|---|---|---|---|
| 10,379,841 B2* | 8/2019 | Wong | G06F 8/658 |
| 11,372,668 B2* | 6/2022 | Cao | G06F 8/63 |
| 11,531,530 B1* | 12/2022 | Henry | G06F 8/65 |
| 12,242,844 B2* | 3/2025 | Ross | G06F 8/71 |
| 2019/0332779 A1* | 10/2019 | Cui | G06F 21/577 |
| 2021/0200814 A1* | 7/2021 | Tal | G06F 16/90335 |
| 2023/0021416 A1* | 1/2023 | Frackiewicz | G06F 8/30 |
| 2024/0184558 A1* | 6/2024 | Chen | G06F 9/5077 |

* cited by examiner

*Primary Examiner* — Marina Lee
(74) *Attorney, Agent, or Firm* — Amin, Turocy & Watson, LLP

(57) ABSTRACT

A system can identify, by a control plane, that a base image has been registered to a first registry that is stored outside of the computing cluster. The system can identify, by the control plane, a trust bundle that corresponds to the base image. The system can send, by the control plane and to a secure pipeline that operates outside of the control plane, a message to update the base image. The system can create, by the secure pipeline, an updated image based on the base image and the trust bundle. The system can send, by the secure pipeline, the updated image to the control plane. The system can store, by the control plane, the updated image in a local registry that is stored on the computing cluster.

20 Claims, 12 Drawing Sheets

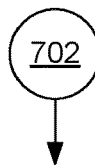

IDENTIFYING THAT AN IDENTITY ACCESS MANAGEMENT PROCESS THAT OPERATES OUTSIDE OF THE CONTROL PLANE HAS IDENTIFIED A PERMISSION OR ROLE MAPPING CHANGE FOR ACCESS TO A WORKLOAD THAT THE BASE IMAGE IS CONFIGURED TO PERFORM 704

GENERATING, BY THE CONTROL PLANE, THE TRUST BUNDLE BASED ON THE PERMISSION OR ROLE MAPPING CHANGE 706

STORING, BY THE CONTROL PLANE, THE TRUST BUNDLE IN A LOCATION SEPARATE FROM THE CONTROL PLANE AND SEPARATE FROM THE IDENTITY ACCESS MANAGEMENT PROCESS 708

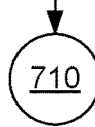

IDENTIFYING THAT A KEY MANAGEMENT SERVICE PROCESS THAT OPERATES OUTSIDE OF THE CONTROL PLANE HAS IDENTIFIED A KEY OR CERTIFICATE CHANGE FOR ACCESS TO A WORKLOAD THAT THE BASE IMAGE IS CONFIGURED TO PERFORM 804

GENERATING, BY THE CONTROL PLANE, THE TRUST BUNDLE BASED ON THE KEY OR CERTIFICATE CHANGE 806

STORING, BY THE CONTROL PLANE, THE TRUST BUNDLE IN A LOCATION SEPARATE FROM THE CONTROL PLANE AND SEPARATE FROM THE KEY MANAGEMENT SERVICE PROCESS 808

SECURING SERVERLESS COMPUTING WORKLOADS IN A COLD START

BACKGROUND

Serverless computing can comprise a relatively new approach to cloud computing that has gained popularity in recent years. A new aspect of serverless computing can be an ability to abstract away an underlying infrastructure to allow developers to focus solely on writing and deploying their code, without having to worry about managing servers. This aspect can allow for more efficient use of resources, and can lead to cost savings for organizations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify, by a control plane, that a base image has been registered to a first registry that is stored outside of the computing cluster. The system can identify, by the control plane, a trust bundle that corresponds to the base image. The system can send, by the control plane and to a secure pipeline that operates outside of the control plane, a message to update the base image. The system can create, by the secure pipeline, an updated image based on the base image and the trust bundle. The system can send, by the secure pipeline, the updated image to the control plane. The system can store, by the control plane, the updated image in a local registry that is stored on the computing cluster.

An example method can comprise identifying, by a control plane of a computing cluster of a system comprising a processor, that a base image has been registered, and a corresponding trust bundle. The method can further comprise sending, by the control plane and to a secure pipeline component of the system that operates outside of the control plane, a message to update the base image. The method can further comprise creating, by the secure pipeline component, an updated image based on the base image and the corresponding trust bundle. The method can further comprise sending, by the secure pipeline component, the updated image to the control plane. The method can further comprise storing, by the control plane, the updated image in a registry that is stored on the computing cluster.

An example non-transitory computer-readable medium can comprise instructions that, in response to execution, cause a system comprising a processor to perform operations. These operations can comprise identifying, by a control plane of a computing cluster, that a base image has been registered, and a corresponding trust bundle. These operations can further comprise sending, by the control plane and to a second system that operates outside of the control plane, a message to update the base image. These operations can further comprise creating, by the second system, an updated image based on the base image and the corresponding trust bundle. These operations can further comprise sending, by the second system, the updated image to the control plane. These operations can further comprise storing, by the control plane, the updated image in a registry that is stored on the computing cluster.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate securing serverless computing workloads in a cold start, in accordance with an embodiment of this disclosure;

FIG. 8 illustrates another example process flow that can facilitate securing serverless computing workloads in a cold start, in accordance with an embodiment of this disclosure;

DETAILED DESCRIPTION

Overview

Figure 1:
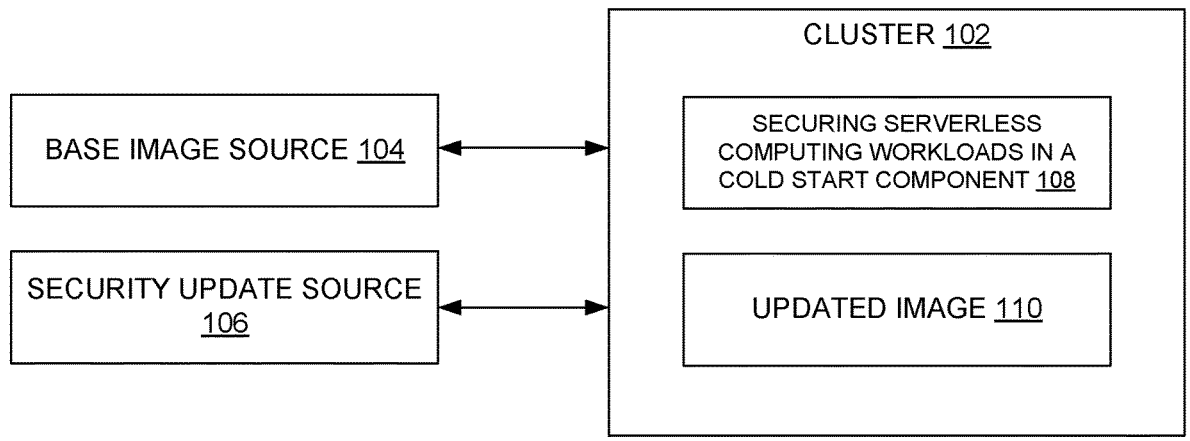
FIG. 1 illustrates an example system architecture that can facilitate securing serverless computing workloads in a cold start, in accordance with an embodiment of this disclosure.

A problem with serverless computing can be a cold start. A cold start can refer to an initial delay that can occur when a function is first triggered after not being used for an extended period of time. When a function is triggered, the cloud provider's infrastructure can spin up a new container to run the function, which can take some time. This delay can result in increased latency and decreased performance for the function. An amount of delay experienced during a cold start can depend on a variety of factors, such as a size and complexity of the function, available resources on infrastructure, and a number of other functions that are also being triggered at the same time.

Cold starts can also pose a security risk in the sense that, while the function is starting, it could be vulnerable to attack. For example, an attacker could potentially exploit a vulnerability in the function before it has fully initialized and begun running securely. To mitigate this risk, it can be important to ensure that functions are properly configured and that any vulnerabilities are identified and addressed before the function is deployed. Configuring a function can comprise including cryptographic data such as certificates and/or keys, and/or data that is used for local authorization. To configure a function in this manner at the time it is invoked can increase an initial delay in running an updated version of the function, from obtaining security data from external sources.

Put another way, a problem with serverless computing can involve how to secure a cold start of a function while minimizing an impact of an initial delay.

The present techniques can be implemented to address this problem with serverless computing. In some examples, upon function docker image publishing, a system can listen to the changes and updates that occur on a key management system (for cryptography changes), and on an identity and access management system (for access permissions changes).

The present techniques can be implemented to create a security update bundle, and to update an initial image with relevant security data, so that the image can be updated with the latest security changes. At the time of a cold start, it can be that the workload will not have external dependencies for obtaining security data, and the security of a process can be increased as all security data associated with an image and function can establish a multiplexed transport layer security (MTLS) connection, perform local authorization, and perform other associated tasks.

The present techniques can be implemented to create a security update bundle and update an initial image with relevant security data, so the image will be updated with the latest security changes. It can be that, at a time of cold start, the workload will not have external dependencies for obtaining security data, so the security of the process can be significantly increased, as all security data parts of the image and function can establish a multiplexed transport layer security connection, perform local authorization, etc. Since the data used in these tasks is not gathered when the cold start begins, there is a lessened time overhead for secure initialization.

A cold start can pose a security risk in the sense that, while the function is starting, it can be vulnerable to attack. For example, an attacker could potentially exploit a vulnerability in the function being started before it has fully initialized and begun running securely.

Cold starts can cause a delay in response time for real-time applications, which can negatively impact their performance and user experience.

A length of a cold start can vary widely depending on a variety of factors, such as a size and complexity of the function, available resources on the cloud provider's infrastructure, and a number of other functions that are also being triggered at the same time.

The present techniques can be implemented to facilitate securing an initialization of functions without affecting a real-time operation of serverless technology.

The proposed solution allows to secure the initialization of the functions without affecting the one of critical points of serverless technology-real-timeness.

According to the present techniques, a security change listener component can be configured to create an updated trust bundle based on changes at a key management system, and/or on an identity and access management system. A change manager component can be configured to manage secure image creation and propagation to a local registry. A secure pipeline component can be configured to create a secure image. A secure pipeline component can comprise part of a CI/CD that is configured to create a function image that is updated with a relevant trust bundle.

In some examples, trust bundles can be added to an image created according to the present techniques without leaving a container orchestration system by using a component in the container orchestration system to build images. In some examples, this can comprise creating a pod in the container orchestration system that runs in a container used by the component that builds images. The pod can have necessary permissions to access container-building files and build context.

The build context can be mounted. The pod can access the build context and container building files in order to build the image. In some examples, this can be accomplished by mounting a volume that contains the build context, security data bundle locations, and docker files to the pod.

Environment variables can be set for the pod, such as a location of the build context and a location of a security bundle, a name of the image, and a target container registry.

A pod can then be started, and logs can be monitored to ensure that a build process completes successfully.

It can be that a security issue at initialization time is relevant not only to serverless functionality, but more generally for all types of workloads. The present techniques can be implemented on any kind of workload image, which includes function images as described herein.

Example Architectures

FIG. 1 illustrates an example system architecture 100 that can facilitate securing serverless computing workloads in a cold start, in accordance with an embodiment of this disclosure. While the examples herein generally relate to serverless computing functions (e.g., computer executable code that is stored in a container and can be invoked by an external entity), it can be appreciated that the present techniques can more broadly relate to tasks or workloads performed by containers (or other computing constructs) where a cold start problem can exist. Additionally, a function as used herein can generally comprise a defined chunk of executable computer code, and can be distinguished from a pure mathematical function.

System architecture 100 comprises cluster 102, base image source 104, security update source 106, securing serverless computing workloads in a cold start component 108, and updated image 110.

Figure 12:
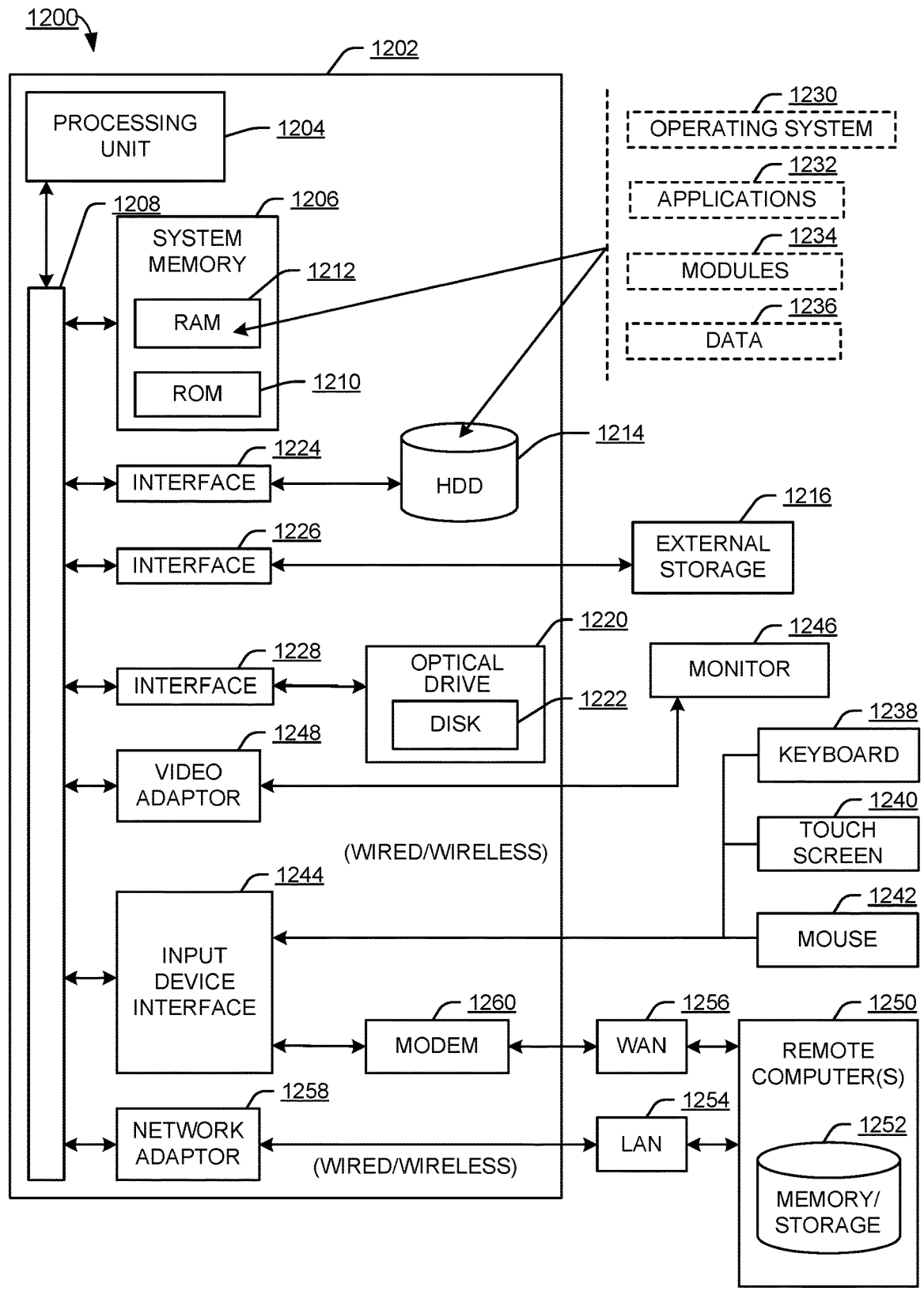
FIG. 12 illustrates an example block diagram of a computer operable to execute an embodiment of this disclosure.

Cluster 102 can comprise a group of computers that operate in concert and can logically be viewed as a single computing system, and can be implemented with part(s) of computing environment 1200 of FIG. 12.

Securing serverless computing workloads in a cold start component 108 can take a base image from base image source 104, and one or more security updates for the base image from security update source 106. Securing serverless computing workloads in a cold start component 108 can apply the security updates to the base image before the base image is instantiated to run a workload (and as security updates are promulgated) and store updated image 110 in cluster 102.

Then, when a function that corresponds to updated image 110 is invoked, and an instance of updated image 110 is not currently running, cluster 102 can instantiate updated image 110, while minimizing a cold start problem because it can be that updated image 110 does not need any security updates to be applied to it.

In some examples, securing serverless computing workloads in a cold start component 108 can implement part(s) of the process flows of FIGS. 3-11 to implement securing serverless computing workloads in a cold start.

It can be appreciated that system architecture 100 is one example system architecture for securing serverless computing workloads in a cold start, and that there can be other system architectures that facilitate securing serverless computing workloads in a cold start.

Figure 2:
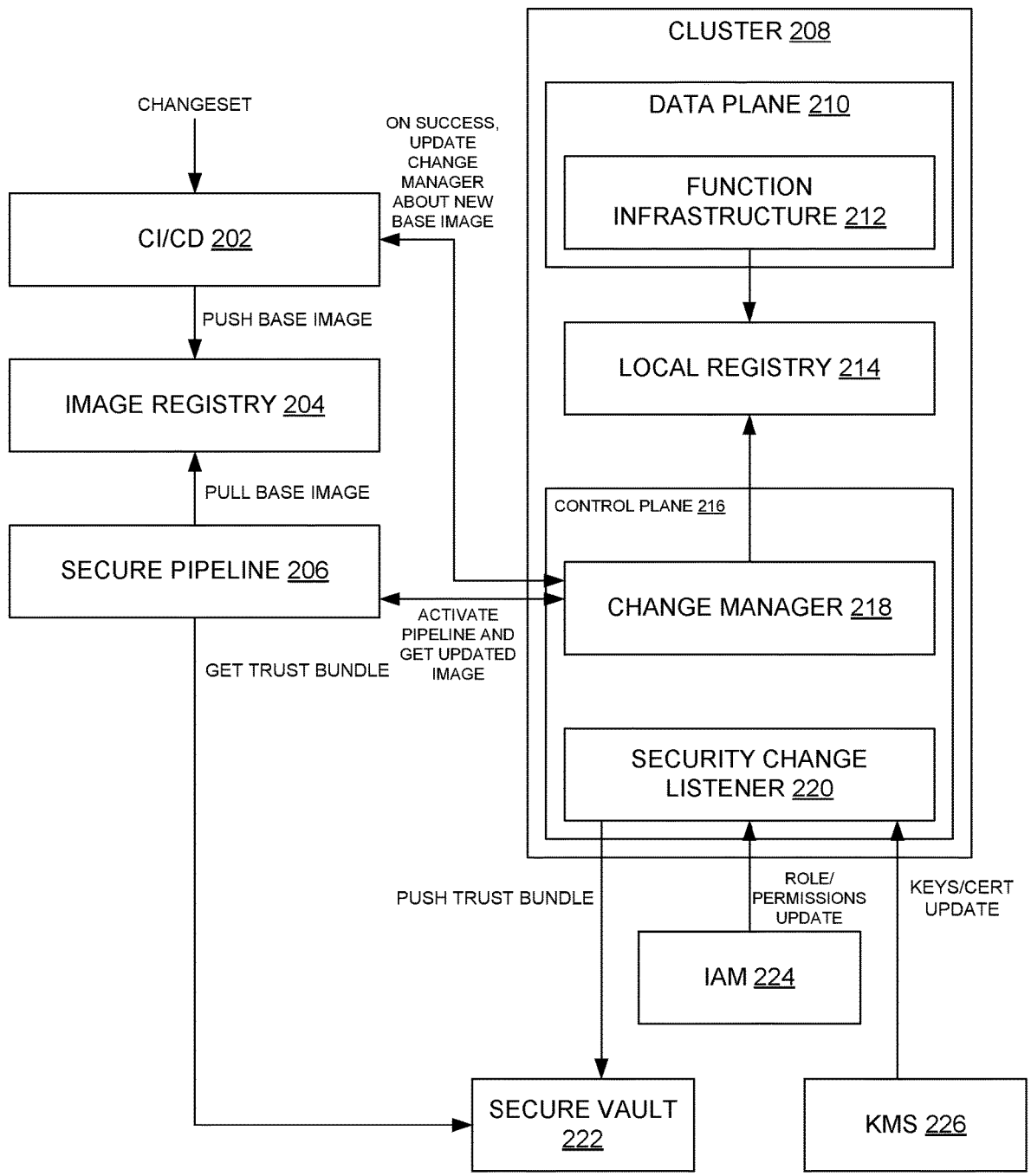
FIG. 2 illustrates another example system architecture that can facilitate securing serverless computing workloads in a cold start, in accordance with an embodiment of this disclosure.

FIG. 2 illustrates another example system architecture 200 that can facilitate securing serverless computing workloads in a cold start, in accordance with an embodiment of this disclosure. In some examples, part(s) of system architecture 200 can be implemented by part(s) of system architecture 100 of FIG. 1 to facilitate securing serverless computing workloads in a cold start.

System architecture 200 comprises CI/CD 202, image registry 204, secure pipeline 206, cluster 208, data plane 210, function infrastructure 212, local registry 214, control plane 216, change manager 218, security change listener 220, secure vault 222, IAM 224, and KMS 226.

Control plane 216 can generally manage container instances of function infrastructure 212 (where containers that execute functions can operate), and data plane 210 can generally facilitate using services offered by function infrastructure 212 (such as an application).

In some examples, the present techniques can be implemented in two main parts: listening to bundle changes from continuous integration/continuous deployment (CI/CD) 202 pipeline; and dynamic modification through runtime entities (e.g., key management system (KMS) 226, and/or identity and access management system (IAM) 224).

Both of these parts can be involved in propagating changes to local nodes' registries (e.g., local registry 214) to prepare each function with a related trust bundle. When deploying a function or service, a corresponding image can be located at the node level in a registry, and there can be a desire to quickly deploy the function or service.

CI/CD 202 can be responsible for aggregating changes from source control per function component, and create an image that is stored in image registry 204. This image can be used as a base image for secure pipeline 206.

Security change listener 220 can, in some examples, utilize a message broker or synchronous end point to receive updates from components that can change a bundle at runtime (e.g., IAM 224 and/or KMS 226). For example, IAM 224 can send changes to permission or role mapping that is related to a specific business logic encapsulated by a specific function. Another example can be a case of a key or certificate rotation procedure done by KMS 226. In some examples, security change listener 220 can propagate, if applicable, the changes throughout cluster 208, ensuring all data planes are up to date. Also, security change listener 220 can responsible for trust bundle creation, and pushing a created trust bundle to secure a vault system (e.g., secure vault 222) (which can comprise an encrypted file system, with a user account needing a permission to access the vault system).

Change manager 218 can be responsible for propagating changes to a local node's registry (e.g., local registry 214). In some examples, changes can be pushed or pulled depending on requirements, and can be consolidated according to customer needs. For example, when a new version of a function is published (where it is related to policy changes), change manager 218 can check if the change was overridden by runtime custom changes, and propagated from IAM 224 or KMS 226. When a new change is introduced, an image can be rebuilt if needed by secure pipeline 206 and pushed to local registry 214, such that a next activation of the function from cold start can utilize the new bundle as part of an image read-only file system (where the image is kept as part of a file system of a container, and the bundle can be considered to be secure because it is a space that cannot be changed). In some examples, it can be that change manager 218 is not responsible for runtime management of policy related changes as an existing service mesh solution can be utilized.

Secure pipeline 206 can be responsible for creating a function image that is updated with a relevant trust bundle. When change manager 218 observes a performing of a new function image creation, or an update in trust bundles, secure pipeline 206 can be triggered. Secure pipeline 206 can take a baseline image from image registry 204 and corresponded trust bundle from secure vault 222, create an updated image with latest security changes (security policies, certificates, keys, etc.), and send the updated image back to change manager 218.

Example Process Flows

Figure 3:
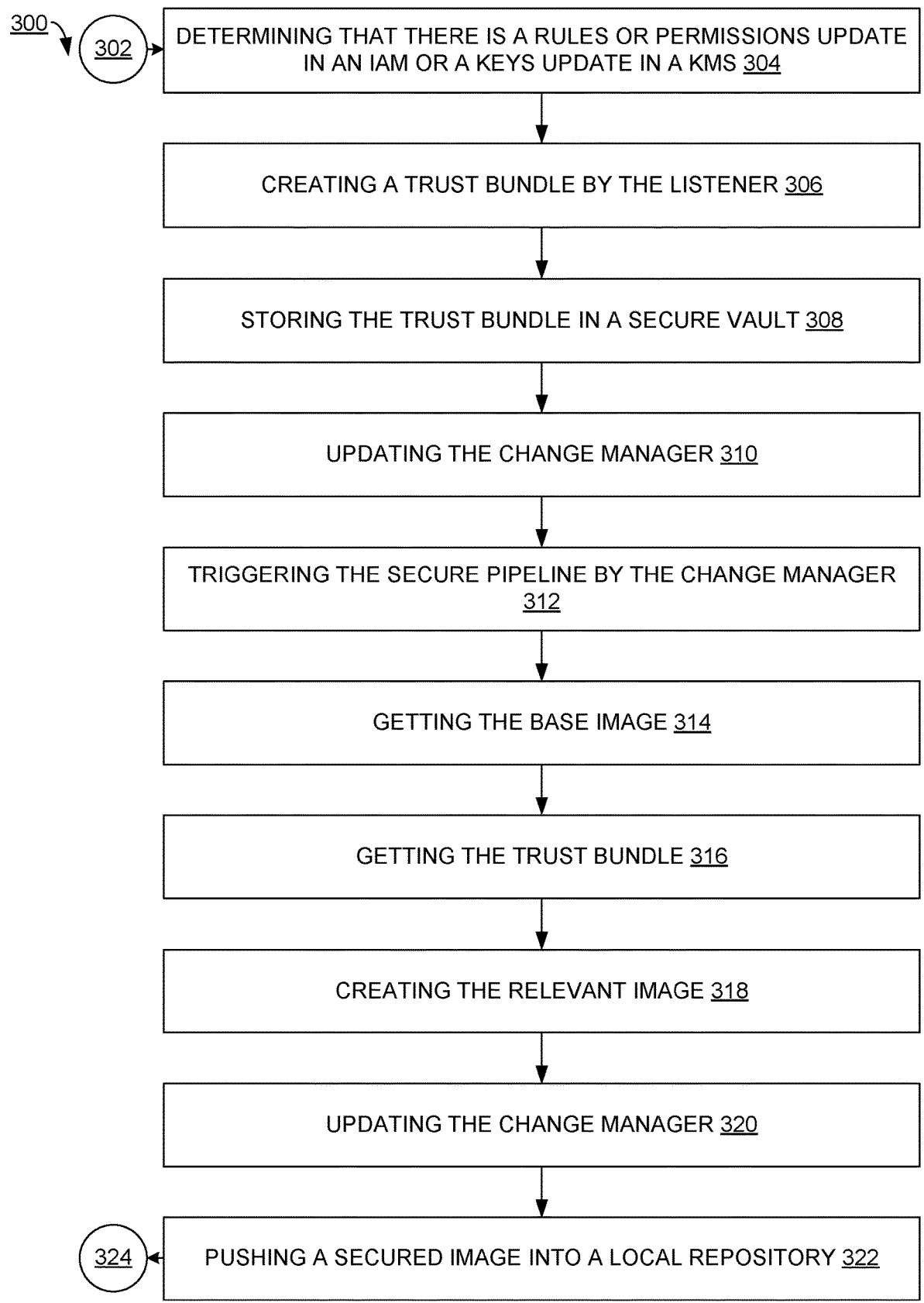
FIG. 3 illustrates an example process flow for creating an updated image based on a permission or cryptography change, and that can facilitate securing serverless computing workloads in a cold start, in accordance with an embodiment of this disclosure.

FIG. 3 illustrates an example process flow 300 for creating an updated image based on a permission or cryptography change, and that can facilitate securing serverless computing workloads in a cold start, in accordance with an embodiment of this disclosure. In some examples, one or more embodiments of process flow 300 can be implemented by securing serverless computing workloads in a cold start component 108 of FIG. 1, or computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 300 begins with 302, and moves to operation 304.

Operation 304 depicts determining that there is a rules or permissions update in an IAM or a keys update in a KMS. Using the example of FIG. 2, this can be performed by security change listener 220 based on an update by IAM 224 or KMS 226.

After operation 304, process flow 300 moves to operation 306.

Operation 306 depicts creating a trust bundle by the listener. This can comprise security change listener 220 creating the trust bundle based on the update identified in operation 304.

After operation 306, process flow 300 moves to operation 308.

Operation 308 depicts storing the trust bundle in a secure vault. This can comprise security change listener 220 storing the trust bundle in secure vault 222.

After operation 308, process flow 300 moves to operation 310.

Operation 310 depicts updating the change manager. This can comprise security change listener 220 informing change manager 218 that security change listener 220 has performed operation 308 (storing the trust bundle in the secure vault).

After operation 310, process flow 300 moves to operation 312.

Operation 312 depicts triggering the secure pipeline by the change manager. This can comprise change manager 218 instructing secure pipeline 206 to create an updated image.

After operation 312, process flow 300 moves to operation 314.

Operation 314 depicts getting the base image. This can comprise secure pipeline 206 obtaining the base image from image registry 204.

After operation 314, process flow 300 moves to operation 316.

Operation 316 depicts getting the trust bundle. This can comprise secure pipeline 206 obtaining the base image from secure vault 222.

After operation 316, process flow 300 moves to operation 318.

Operation 318 depicts creating the relevant image. This can comprise secure pipeline 206 creating an updated image based on the base image from operation 314 and the trust bundle from operation 316.

After operation 318, process flow 300 moves to operation 320.

Operation 320 depicts updating the change manager. This can comprise secure pipeline 206 sending a copy of the updated image to change manager 218.

After operation 320, process flow 300 moves to operation 322.

Operation 322 depicts pushing a secured image into a local repository. This can comprise change manager 218 storing the copy of the updated image in local registry 214.

After operation 322, process flow 300 moves to 324, where process flow 300 ends.

Figure 4:
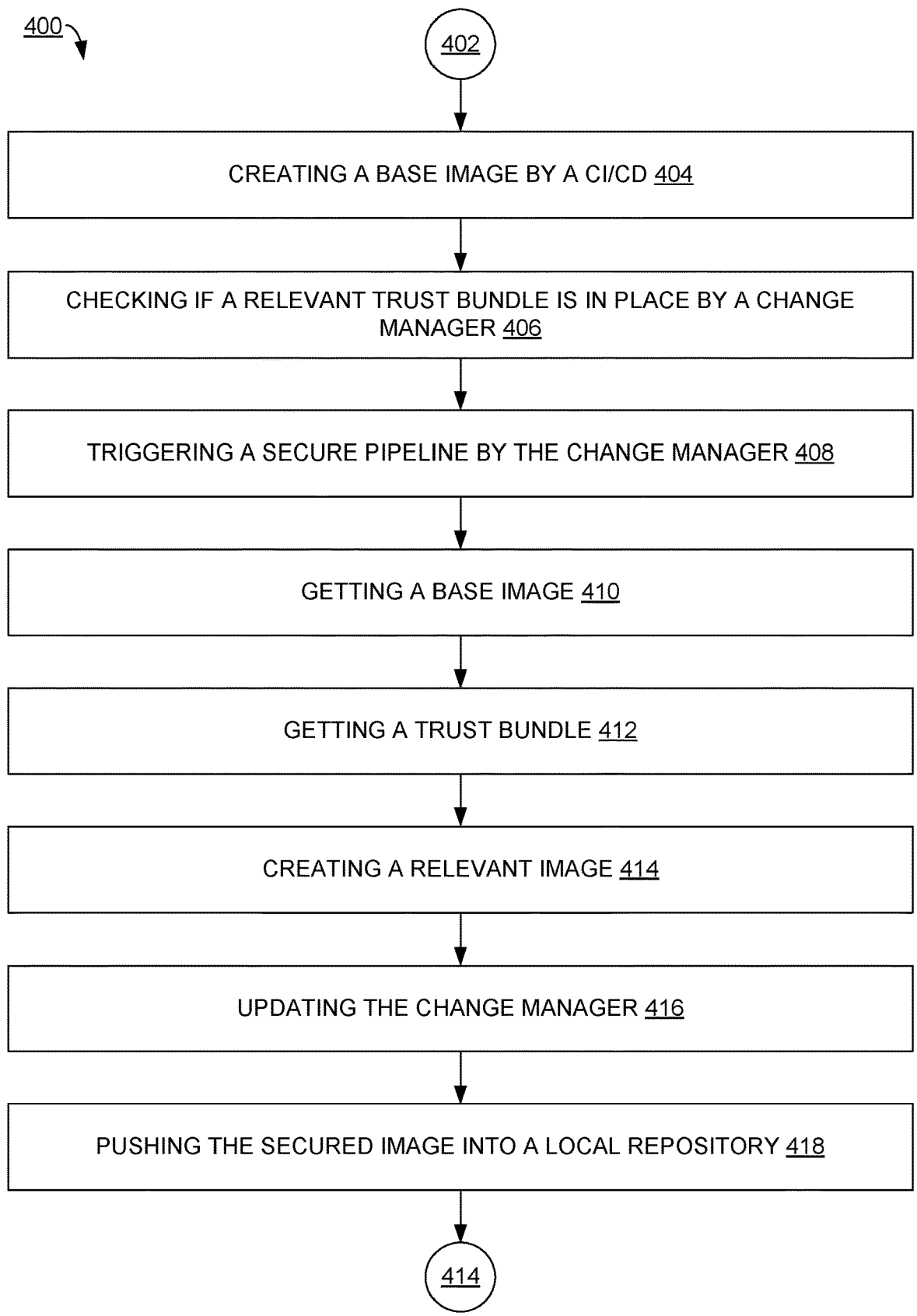
FIG. 4 illustrates an example process flow for creating an updated image based on a new base image, and that can facilitate securing serverless computing workloads in a cold start, in accordance with an embodiment of this disclosure.

FIG. 4 illustrates an example process flow for creating an updated image based on a new base image, and that can facilitate securing serverless computing workloads in a cold start, in accordance with an embodiment of this disclosure. In some examples, one or more embodiments of process flow 400 can be implemented by securing serverless computing workloads in a cold start component 108 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 400 begins with 402, and moves to operation 404.

Operation 404 depicts creating a base image by a CI/CD. Using the example of FIG. 2, this can comprise CI/CD 202 creating a base image, such as based on a received changeset.

After operation 404, process flow 400 moves to operation 406.

Operation 406 depicts checking if a relevant trust bundle is in place by a change manager. This can comprise change manager 220 determining whether a trust bundle that corresponds to the base image (of operation 404) is stored in secure vault 222.

After operation 406, process flow 400 moves to operation 408.

Operation 408 depicts triggering a secure pipeline by the change manager. This can comprise change manager 218 instructing secure pipeline 206 to create an updated image, and can be performed in a similar manner as operation 312 of FIG. 3.

After operation 408, process flow 400 moves to operation 410.

Operation 410 depicts getting a base image. This can comprise secure pipeline 206 obtaining the base image from image registry 204, and can be performed in a similar manner as operation 314 of FIG. 3.

After operation 410, process flow 400 moves to operation 412.

Operation 412 depicts getting a trust bundle. This can comprise secure pipeline 206 obtaining the base image from secure vault 222, and can be performed in a similar manner as operation 316 of FIG. 3.

After operation 412, process flow 400 moves to operation 414.

Operation 414 depicts creating a relevant image. This can comprise secure pipeline 206 creating an updated image based on the base image from operation 410 and the trust bundle from operation 412, and can be performed in a similar manner as operation 318 of FIG. 3.

After operation 414, process flow 400 moves to operation 416.

Operation 416 depicts updating the change manager. This can comprise secure pipeline 206 sending a copy of the updated image to change manager 218, and can be performed in a similar manner as operation 320 of FIG. 3.

After operation 416, process flow 400 moves to operation 418.

Operation 418 depicts pushing the secured image into a local repository. This can comprise change manager 218 storing the copy of the updated image in local registry 214, and can be performed in a similar manner as operation 322 of FIG. 3.

After operation 404, process flow 400 moves to 420, where process flow 400 ends.

Figure 5:
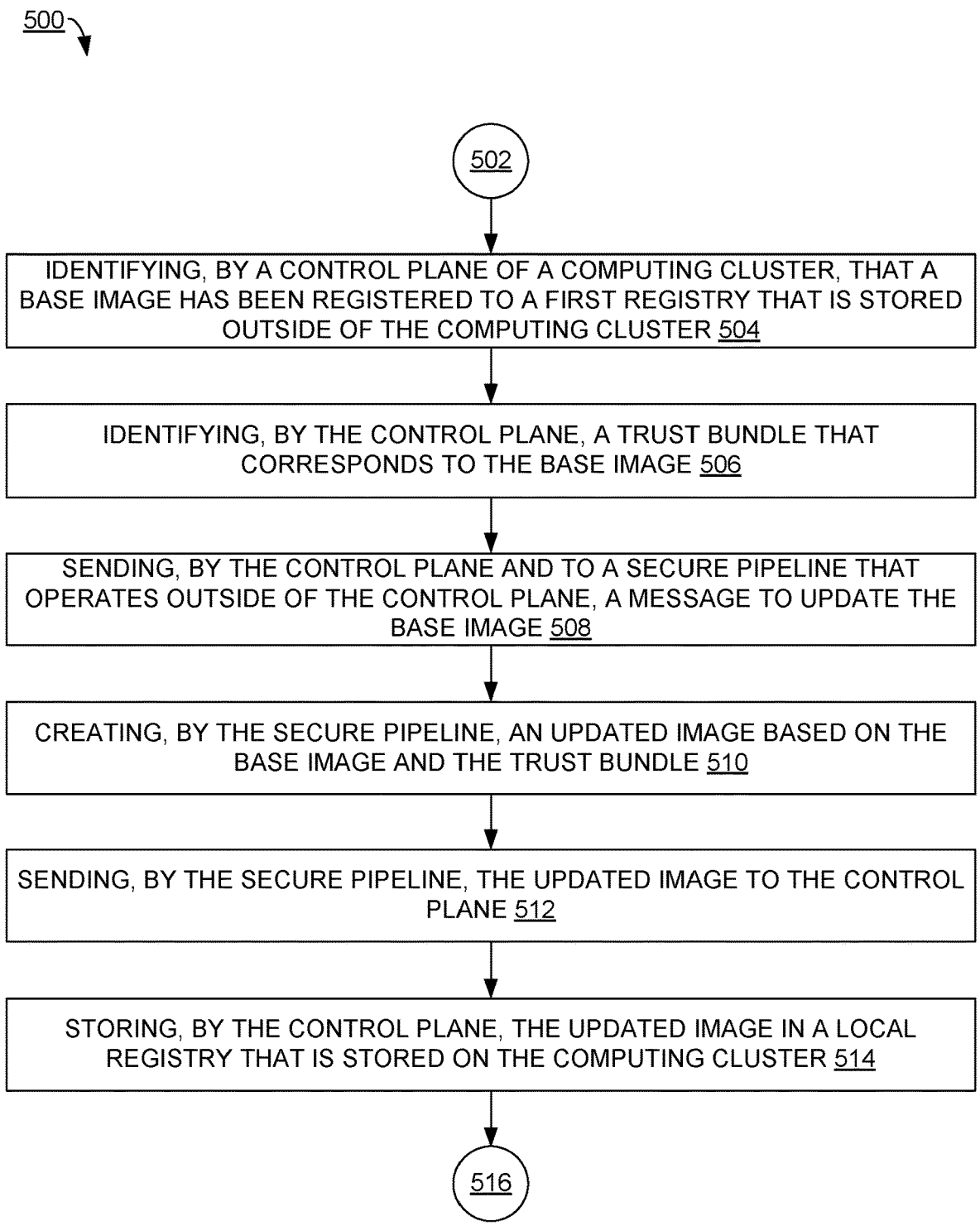
FIG. 5 illustrates an example process flow that can facilitate securing serverless computing workloads in a cold start, in accordance with an embodiment of this disclosure.

FIG. 5 illustrates an example process flow for securing serverless computing workloads in a cold start, in accordance with an embodiment of this disclosure. In some examples, one or more embodiments of process flow 500 can be implemented by securing serverless computing workloads in a cold start component 108 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504.

Operation 504 depicts identifying, by a control plane of a computing cluster, that a base image has been registered to a first registry that is stored outside of the computing cluster. Using the example of FIG. 2, CI/CD 202 can create the base image and push it to image registry 204, and this can be identified by change manager 218 of control plane 216.

In some examples, the identifying that the base image has been registered to the first registry is performed based on a continuous integration and deployment process used to create the base image. That is, a component similar to CI/CD 202 of FIG. 2 can create the base image.

After operation 504, process flow 500 moves to operation 506.

Operation 506 depicts identifying, by the control plane, a trust bundle that corresponds to the base image. Continuing with the example of FIG. 2, that is, there can be a rules and/or permissions update in an IAM component (e.g., IAM 224 of FIG. 2), and/or a certificates and/or keys update in a KMS component (e.g., KMS 226) that is relevant to the base image.

After operation 506, process flow 500 moves to operation 508.

Operation 508 depicts sending, by the control plane and to a secure pipeline that operates outside of the control plane, a message to update the base image. Continuing with the example of FIG. 2, that is, change manager 218 can trigger secure pipeline 206.

After operation 508, process flow 500 moves to operation 510.

Operation 510 depicts creating, by the secure pipeline, an updated image based on the base image and the trust bundle. Continuing with the example of FIG. 2, that is, secure pipeline 206 can create an updated image that incorporates both the base image and the trust bundle.

After operation 510, process flow 500 moves to operation 512.

Operation 512 depicts sending, by the secure pipeline, the updated image to the control plane.

After operation 512, process flow 500 moves to operation 514. Continuing with the example of FIG. 2, that is, secure pipeline 206 can send the updated image to change manager 218 of control plane 216.

Operation 514 depicts storing, by the control plane, the updated image in a local registry that is stored on the computing cluster. Continuing with the example of FIG. 2, that is, change manager 218 of control plane 216 can store the updated image in local registry 214 of cluster 208.

After operation 514, process flow 500 moves to 516, where process flow 500 ends.

Figure 6:
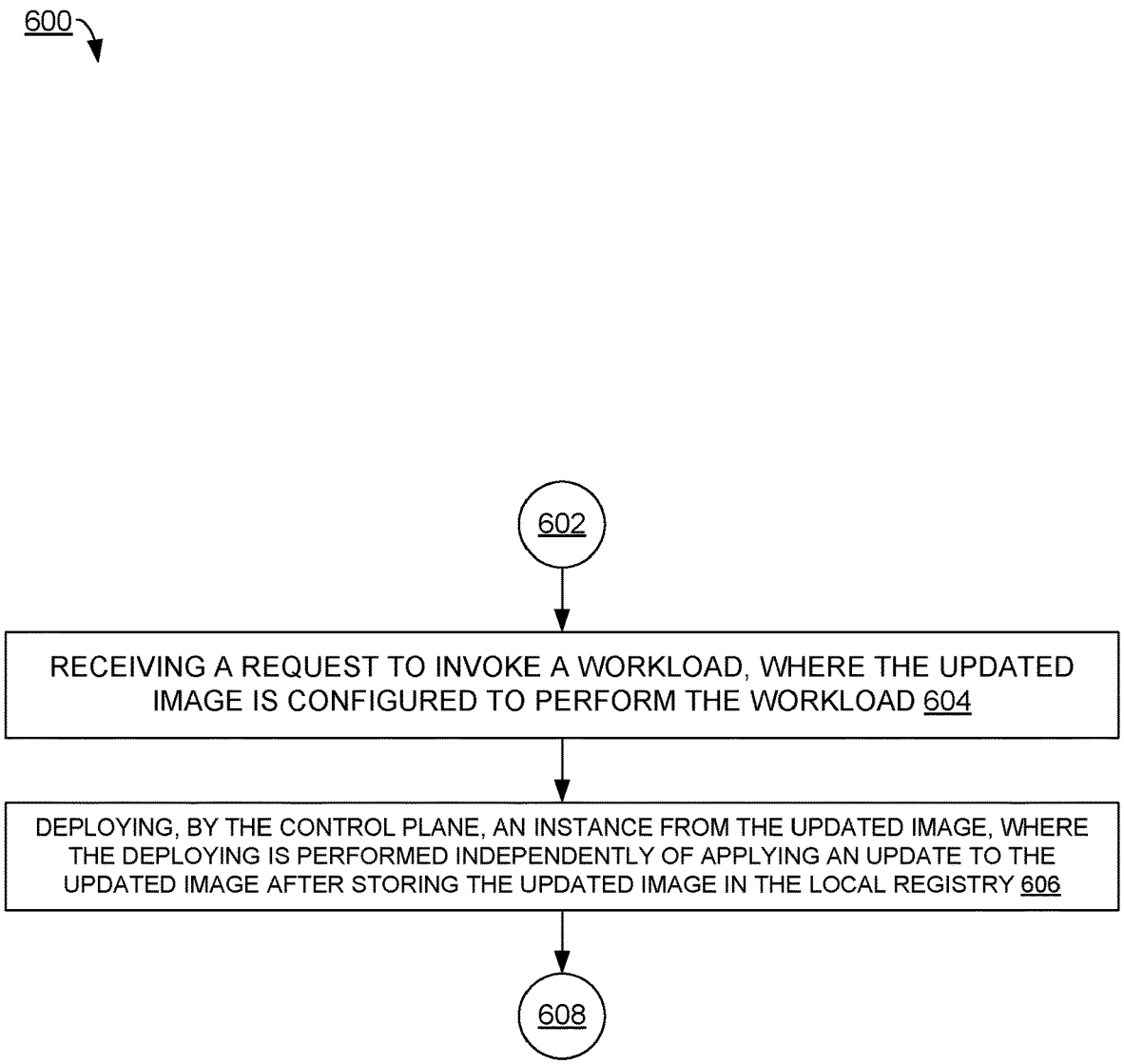
FIG. 6 illustrates another example process flow that can facilitate securing serverless computing workloads in a cold start, in accordance with an embodiment of this disclosure.

FIG. 6 illustrates another example process flow for securing serverless computing workloads in a cold start, in accordance with an embodiment of this disclosure. In some examples, one or more embodiments of process flow 600 can be implemented by securing serverless computing workloads in a cold start component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604.

Operation 604 depicts receiving a request to invoke a workload, where the updated image is configured to perform the workload. In some examples, this can be a request received by cluster 102 to invoke a function that updated image 110 is configured to execute.

After operation 604, process flow 600 moves to operation 606.

Operation 606 depicts deploying, by the control plane, an instance from the updated image, where the deploying is performed independently of applying an update to the updated image after storing the updated image in the local registry. Using the example of FIG. 2, the control plane can be control plane 216, and the updated image can be stored in local registry 214.

It can be, in operation 606, that an instance of the updated image can be quickly spin up because it is updated with current security and permissions updates, so those do not need to be applied at a time of instantiation, which can slow down instantiation.

Together, operations 604-606 can comprise, in response to receiving a request to invoke a workload, where the updated image is configured to perform the workload, deploying, by the control plane, an instance from the updated image, where the deploying is performed independently of applying an update to the updated image after storing the updated image in the local registry.

After operation 606, process flow 600 moves to 608, where process flow 600 ends.

FIG. 7 illustrates another example process flow for securing serverless computing workloads in a cold start, in accordance with an embodiment of this disclosure. In some examples, one or more embodiments of process flow 700 can be implemented by securing serverless computing workloads in a cold start component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704.

Operation 704 depicts identifying that an identity access management process that operates outside of the control plane has identified a permission or role mapping change for access to a workload that the base image is configured to perform. That is, a new trust bundle can be generated because of an IAM change. Using the example of FIG. 2, the key management service can be IAM 224, and the control plane can be control plane 216.

After operation 704, process flow 700 moves to operation 706.

Operation 706 depicts generating, by the control plane, the trust bundle based on the permission or role mapping change. That is, the trust bundle can be created within the control plane.

After operation 706, process flow 700 moves to operation 708.

Operation 708 depicts storing, by the control plane, the trust bundle in a location separate from the control plane and separate from the identity access management process. Using the example of FIG. 2, this location can be secure vault 222.

After operation 706, process flow 700 moves to 710, where process flow 700 ends.

FIG. 8 illustrates another example process flow for securing serverless computing workloads in a cold start, in accordance with an embodiment of this disclosure. In some examples, one or more embodiments of process flow 800 can be implemented by securing serverless computing workloads in a cold start component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804.

Operation 804 depicts identifying that a key management service process that operates outside of the control plane has identified a key or certificate change for access to a workload that the base image is configured to perform. That is, a new trust bundle can be generated because of a KMS change. Using the example of FIG. 2, the key management service can be KMS 226, and the control plane can be control plane 216.

After operation 804, process flow 800 moves to operation 806.

Operation 806 depicts generating, by the control plane, the trust bundle based on the key or certificate change. That is, the trust bundle can be created within the control plane.

After operation 806, process flow 800 moves to operation 808.

Operation 808 depicts storing, by the control plane, the trust bundle in a location separate from the control plane and separate from the key management service process. Using the example of FIG. 2, this location can be secure vault 222.

After operation 808, process flow 800 moves to 810, where process flow 800 ends.

Figure 9:
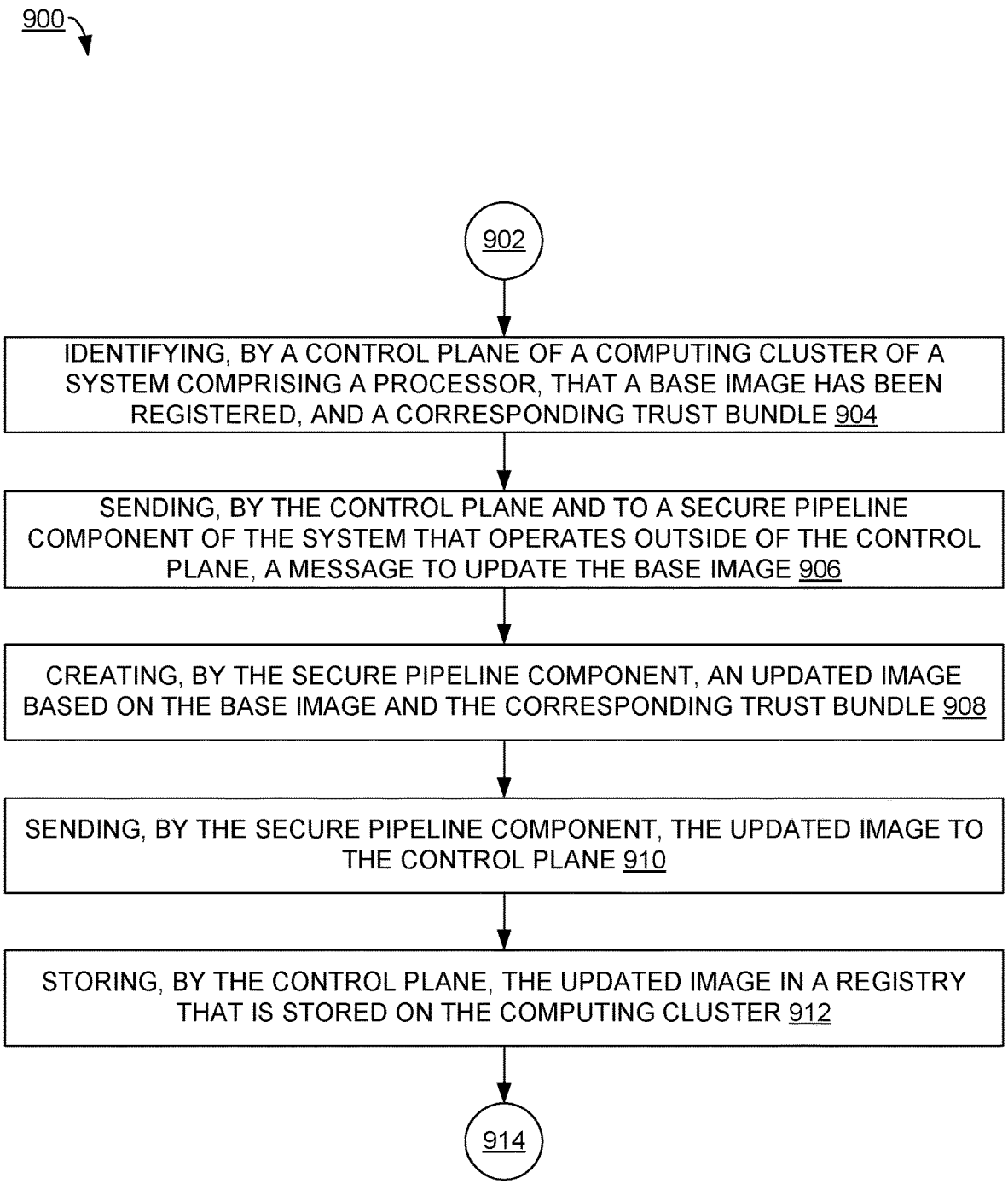
FIG. 9 illustrates another example process flow that can facilitate securing serverless computing workloads in a cold start, in accordance with an embodiment of this disclosure.

FIG. 9 illustrates another example process flow for securing serverless computing workloads in a cold start, in accordance with an embodiment of this disclosure. In some examples, one or more embodiments of process flow 900 can be implemented by securing serverless computing workloads in a cold start component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904.

Operation 904 depicts identifying, by a control plane of a computing cluster of a system comprising a processor, that a base image has been registered, and a corresponding trust bundle. In some examples, operation 904 can be implemented in a similar manner as operations 504-506 of FIG. 5.

In some examples, operation 904 comprises identifying, by the control plane, that a component external to the computing cluster has generated an update that corresponds to the corresponding trust bundle via a message broker. In some examples, operation 904 comprises identifying, by the control plane, that a component external to the computing cluster has generated an update that corresponds to the corresponding trust bundle via a synchronous end point. That is, a security change listener component can utilize a message broker and/or synchronous end point to receive updates from components that are capable of changing a trust bundle at runtime.

After operation 904, process flow 900 moves to operation 906.

Operation 906 depicts sending, by the control plane and to a secure pipeline component of the system that operates outside of the control plane, a message to update the base image. In some examples, operation 906 can be implemented in a similar manner as operation 508 of FIG. 5.

After operation 906, process flow 900 moves to operation 908.

Operation 908 depicts creating, by the secure pipeline component, an updated image based on the base image and the corresponding trust bundle. In some examples, operation 908 can be implemented in a similar manner as operation 510 of FIG. 5.

After operation 908, process flow 900 moves to operation 910.

Operation 910 depicts sending, by the secure pipeline component, the updated image to the control plane. In some examples, operation 910 can be implemented in a similar manner as operation 512 of FIG. 5.

After operation 910, process flow 900 moves to operation 912.

Operation 912 depicts storing, by the control plane, the updated image in a registry that is stored on the computing cluster. In some examples, operation 912 can be implemented in a similar manner as operation 514 of FIG. 5.

In some examples, after instantiation, the updated image is configured to establish a transport layer security connection independently of further updating the updated image. In some examples, after instantiation, the updated image is configured to perform local authorization independently of further updating the updated image. That is, it can be that security data that is part of the image and function can be used to establish a MTLS connection, and/or perform local authorization.

After operation 912, process flow 900 moves to 914, where process flow 900 ends.

Figure 10:
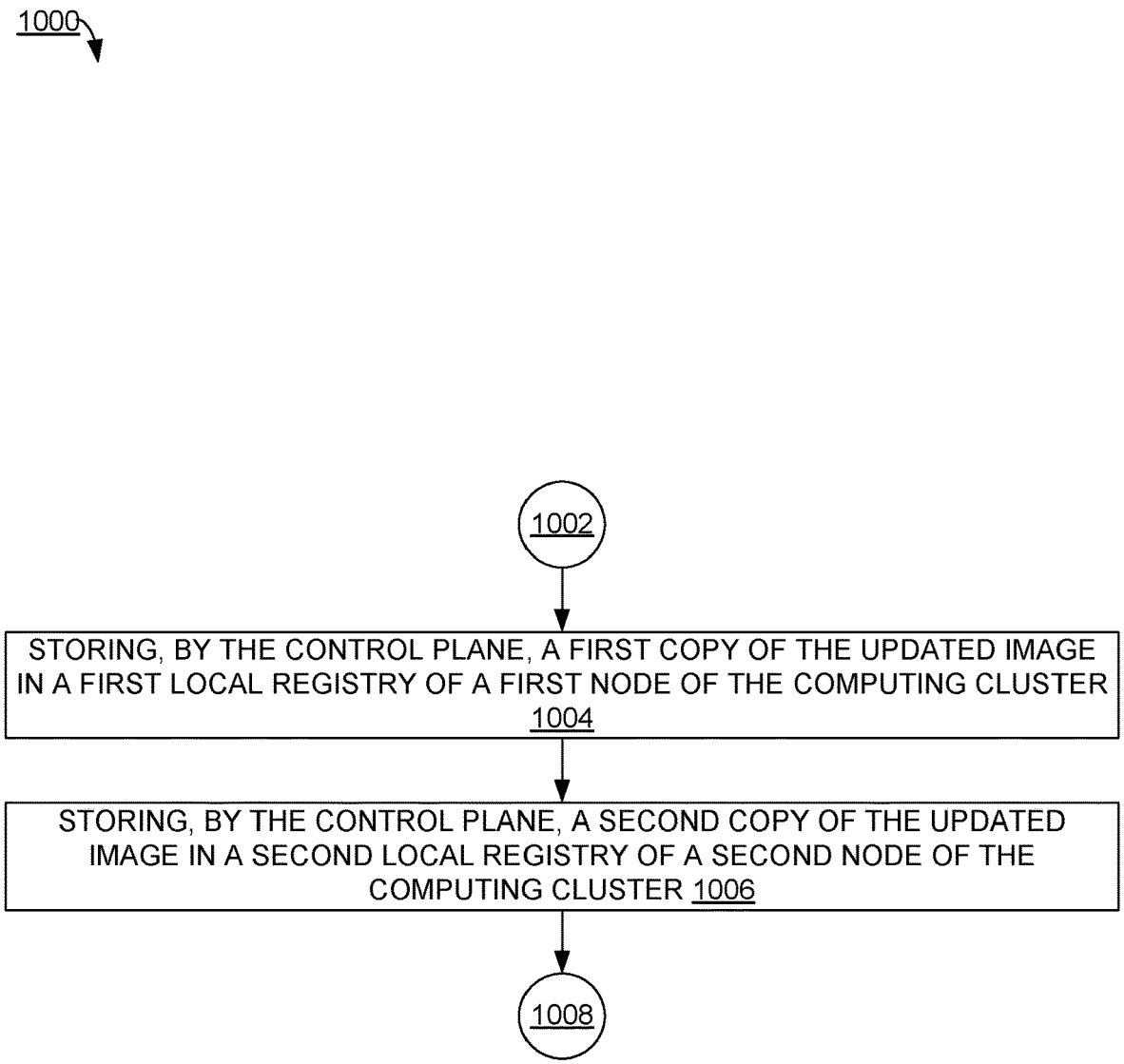
FIG. 10 illustrates another example process flow that can facilitate securing serverless computing workloads in a cold start, in accordance with an embodiment of this disclosure.

FIG. 10 illustrates another example process flow for securing serverless computing workloads in a cold start, in accordance with an embodiment of this disclosure. In some examples, one or more embodiments of process flow 1000 can be implemented by securing serverless computing workloads in a cold start component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004.

Operation 1004 depicts storing, by the control plane, a first copy of the updated image in a first local registry of a first node of the computing cluster. This local registry can be similar to local registry 214 of FIG. 2, of cluster 208, where the control plane can be similar to control plane 216.

After operation 1004, process flow 1000 moves to operation 1006.

Operation 1006 depicts storing, by the control plane, a second copy of the updated image in a second local registry of a second node of the computing cluster. That is, as there are more updates, these updates can continue to be applied to the base image so that the image can be instantiated while mitigating against a cold start problem.

After operation 1006, process flow 1000 moves to 1008, where process flow 1000 ends.

Figure 11:
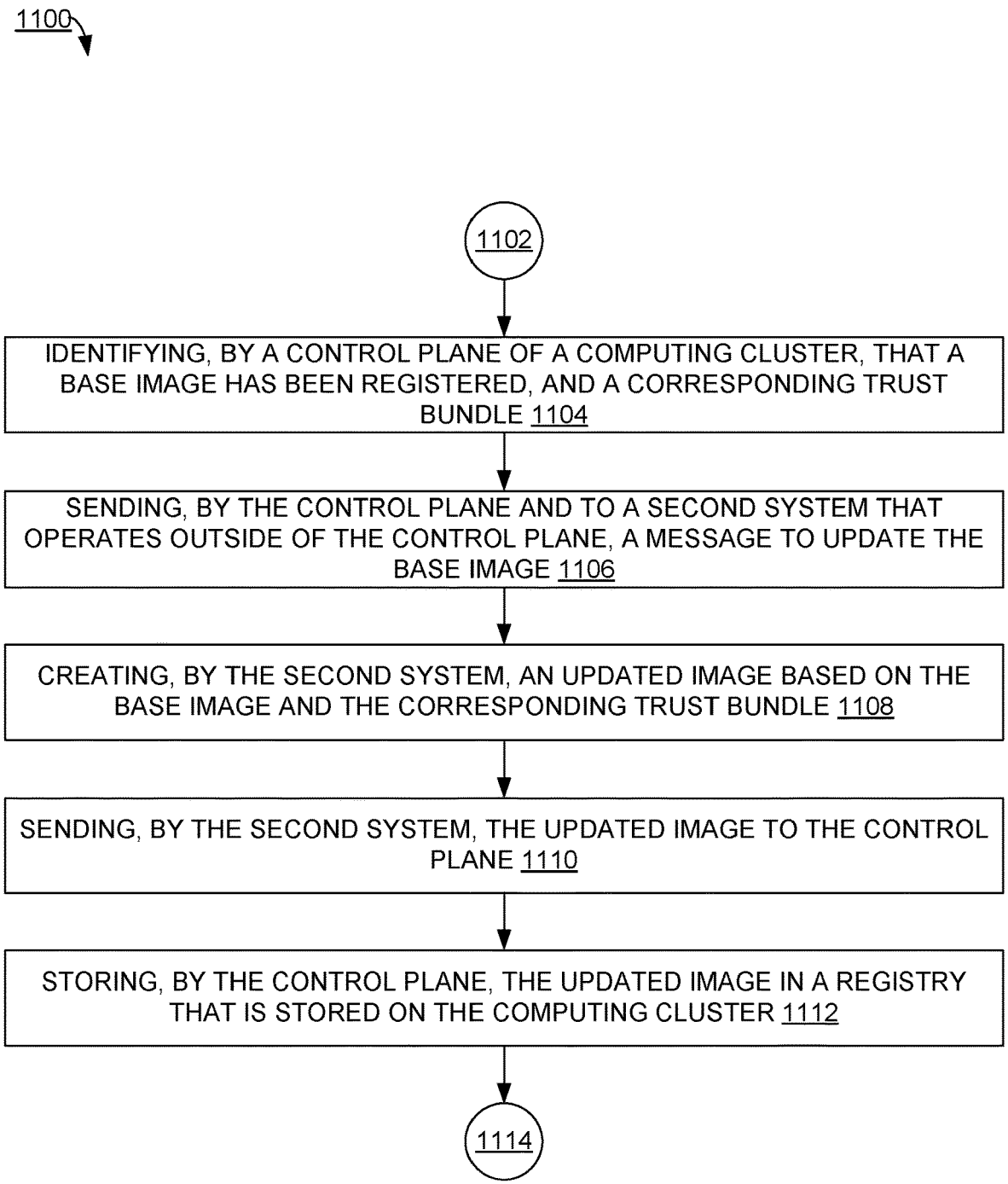
FIG. 11 illustrates another example process flow that can facilitate securing serverless computing workloads in a cold start, in accordance with an embodiment of this disclosure.

FIG. 11 illustrates another example process flow for securing serverless computing workloads in a cold start, in accordance with an embodiment of this disclosure. In some examples, one or more embodiments of process flow 1100 can be implemented by securing serverless computing workloads in a cold start component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, process flow 1100 of FIG. 11, and/or process flow 1100 of FIG. 11.

Process flow 1100 begins with 1102, and moves to operation 1104.

Operation 1104 depicts identifying, by a control plane of a computing cluster, that a base image has been registered, and a corresponding trust bundle. In some examples, operation 1104 can be implemented in a similar manner as operations 504-506 of FIG. 5.

In some examples, the identifying that the base image has been registered, and the corresponding trust bundle comprises the control plane receiving a push notification of the base image or the corresponding trust bundle. In some examples, the identifying that the base image has been registered, and the corresponding trust bundle comprises the control plane performing a pull of the base image or the corresponding trust bundle. That is, in some examples, a change manager component can be configured to propagate changes to a local node's registry. In some examples, changes can be pushed and/or pulled.

In some examples, the base image comprises computer-executable code that is configured to be invoked by an external requestor, and a runtime, a system tool, a system library, or a setting that support invoking the computer-executable code, and wherein the base image omits an operating system.

After operation 1104, process flow 1100 moves to operation 1106.

Operation 1106 depicts sending, by the control plane and to a second system that operates outside of the control plane, a message to update the base image. In some examples, operation 1106 can be implemented in a similar manner as operation 508 of FIG. 5.

In some examples, operation 1106 is performed based on the control plane determining that a policy of the base image is overridden by the corresponding trust bundle. That is, when a new version of a function is published (which can be related to policy changes), a change manager can check whether the change is overridden by runtime custom changes that can be propagated from an IAM or a KMS component.

After operation 1106, process flow 1100 moves to operation 1108.

Operation 1108 depicts creating, by the second system, an updated image based on the base image and the corresponding trust bundle. In some examples, operation 1108 can be implemented in a similar manner as operation 510 of FIG. 5.

After operation 1108, process flow 1100 moves to operation 1110.

Operation 1110 depicts sending, by the second system, the updated image to the control plane. In some examples, operation 1110 can be implemented in a similar manner as operation 512 of FIG. 5.

After operation 1110, process flow 1100 moves to operation 1112.

Operation 1112 depicts storing, by the control plane, the updated image in a registry that is stored on the computing cluster. In some examples, operation 1112 can be implemented in a similar manner as operation 514 of FIG. 5.

After operation 1112, process flow 1100 moves to 1114, where process flow 500 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cluster 102 of FIG. 1, and/or cluster 208 of FIG. 2.

In some examples, computing environment 1200 can implement one or more embodiments of the process flows of FIGS. 3-11 to facilitate securing serverless computing workloads in a cold start.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, stand-alone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a processor; and
 a memory coupled to the processor, comprising instructions that, in response to execution by the processor, cause the system to perform operations, comprising:
  identifying, by a control plane of a computing cluster, that a base image has been registered to a first registry that is stored outside of the computing cluster;
  identifying, by the control plane, a trust bundle that corresponds to the base image;
  sending, by the control plane and to a secure pipeline that operates outside of the control plane, a message to update the base image;
  creating, by the secure pipeline, an updated image based on the base image and the trust bundle;

sending, by the secure pipeline, the updated image to the control plane; and storing, by the control plane, the updated image in a local registry that is stored on the computing cluster.

2. The system of claim 1, wherein the operations further comprise:

in response to receiving a request to invoke a workload, wherein the updated image is configured to perform the workload, deploying, by the control plane, an instance from the updated image, wherein the deploying is performed independently of applying an update to the updated image after storing the updated image in the local registry.

3. The system of claim 1, wherein the identifying that the base image has been registered to the first registry is performed based on a continuous integration and deployment process used to create the base image.

4. The system of claim 1, wherein the identifying the trust bundle that corresponds to the base image comprises identifying that an identity access management process that operates outside of the control plane has identified a permission or role mapping change for access to a workload that the base image is configured to perform.

5. The system of claim 4, wherein the operations further comprise:

generating, by the control plane, the trust bundle based on the permission or role mapping change.

6. The system of claim 5, wherein the operations further comprise:

storing, by the control plane, the trust bundle in a location separate from the control plane and separate from the identity access management process.

7. The system of claim 1, wherein the identifying, by the control plane, the trust bundle that corresponds to the base image comprises identifying that a key management service process that operates outside of the control plane has identified a key or certificate change for access to a workload that the base image is configured to perform.

8. The system of claim 7, wherein the operations further comprise:

generating, by the control plane, the trust bundle based on the key or certificate change.

9. The system of claim 8, wherein the operations further comprise:

storing, by the control plane, the trust bundle in a location separate from the control plane and separate from the key management service process.

10. A method, comprising:

identifying, by a control plane of a computing cluster of a system comprising a processor, that a base image has been registered, and a corresponding trust bundle;

sending, by the control plane and to a secure pipeline component of the system that operates outside of the control plane, a message to update the base image;

creating, by the secure pipeline component, an updated image based on the base image and the corresponding trust bundle;

sending, by the secure pipeline component, the updated image to the control plane; and storing, by the control plane, the updated image in a registry that is stored on the computing cluster.

11. The method of claim 10, wherein, after instantiation, the updated image is configured to establish a transport layer security connection independently of further updating the updated image.

12. The method of claim 10, wherein, after instantiation, the updated image is configured to perform local authorization independently of further updating the updated image.

13. The method of claim 10, wherein storing, by the control plane, the updated image in the registry that is stored on the computing cluster comprises:

storing, by the control plane, a first copy of the updated image in a first local registry of a first node of the computing cluster; and storing, by the control plane, a second copy of the updated image in a second local registry of a second node of the computing cluster.

14. The method of claim 10, further comprising:

identifying, by the control plane, that a component external to the computing cluster has generated an update that corresponds to the corresponding trust bundle via a message broker.

15. The method of claim 10, further comprising:

identifying, by the control plane, that a component external to the computing cluster has generated an update that corresponds to the corresponding trust bundle via a synchronous end point.

16. A non-transitory computer-readable medium comprising instructions that, in response to execution, cause a first system comprising a processor to perform operations, comprising:

identifying, by a control plane of a computing cluster, that a base image has been registered, and a corresponding trust bundle;

sending, by the control plane and to a second system that operates outside of the control plane, a message to update the base image;

creating, by the second system, an updated image based on the base image and the corresponding trust bundle;

sending, by the second system, the updated image to the control plane; and storing, by the control plane, the updated image in a registry that is stored on the computing cluster.

17. The non-transitory computer-readable medium of claim 16, wherein the identifying that the base image has been registered, and the corresponding trust bundle comprises the control plane receiving a push notification of the base image or the corresponding trust bundle.

18. The non-transitory computer-readable medium of claim 16, wherein the identifying that the base image has been registered, and the corresponding trust bundle comprises the control plane performing a pull of the base image or the corresponding trust bundle.

19. The non-transitory computer-readable medium of claim 16, wherein sending the message to update the base image is performed based on the control plane determining that a policy of the base image is overridden by the corresponding trust bundle.

20. The non-transitory computer-readable medium of claim 16, wherein the base image comprises computer-executable code that is configured to be invoked by an external requestor, and a runtime, a system tool, a system library, or a setting that support invoking the computer-executable code, and wherein the base image omits an operating system.

* * * * *